(12) United States Patent
Mai et al.

(10) Patent No.: US 8,388,027 B2
(45) Date of Patent: Mar. 5, 2013

(54) CONDUIT ARRANGEMENT FOR A PRESSURIZED FLUID, AND METHOD FOR THE PRODUCTION THEREOF

(75) Inventors: Sven Mai, Linsengericht (DE); Thomas Grasmueck, Ronneburg (DE); Marc Van Hooren, Freigericht-Bernbach (DE); Roland Eisenacher, Floersbachtal (DE); Peter Kahn, Erlensee (DE)

(73) Assignee: Veritas AG, Gelnhausen (DE)

( * ) Notice: Subject to any disclaimer, the term of this patent is extended or adjusted under 35 U.S.C. 154(b) by 557 days.

(21) Appl. No.: 12/615,542

(22) Filed: Nov. 10, 2009

(65) Prior Publication Data

US 2010/0126303 A1 May 27, 2010

(30) Foreign Application Priority Data

Nov. 26, 2008 (DE) .......................... 10 2008 059 087

(51) Int. Cl.
*F16L 41/00* (2006.01)
(52) U.S. Cl. ...................... 285/208; 285/124.3; 285/206; 285/288.1
(58) Field of Classification Search .................. 285/208, 285/207, 206, 205, 191, 124.1, 124.2, 124.3
See application file for complete search history.

(56) References Cited

U.S. PATENT DOCUMENTS

| | | | | |
|---|---|---|---|---|
| 3,270,966 A * | 9/1966 | Ackley | ........................... | 239/550 |
| 4,482,172 A | 11/1984 | DeVera et al. | | |
| 5,180,005 A * | 1/1993 | Marsais et al. | ................ | 285/205 |
| 5,354,101 A * | 10/1994 | Anderson, Jr. | ............. | 285/124.5 |
| 5,383,690 A * | 1/1995 | Niemeier et al. | .......... | 285/124.1 |
| 5,820,167 A * | 10/1998 | Linkner, Jr. | ................ | 285/124.1 |
| 6,199,916 B1 | 3/2001 | Klinger et al. | | |
| 6,866,300 B2 * | 3/2005 | Hayes et al. | ................ | 285/124.2 |
| 6,893,052 B2 * | 5/2005 | Wildermuth et al. | ......... | 285/205 |
| 7,156,423 B2 | 1/2007 | Marks | | |
| 7,621,568 B2 * | 11/2009 | Schroeder et al. | ............ | 285/205 |
| 7,766,391 B2 * | 8/2010 | Kim et al. | ..................... | 285/205 |
| 2004/0080155 A1 | 4/2004 | Hayes et al. | | |
| 2004/0201212 A1 | 10/2004 | Marks | | |
| 2005/0285393 A1 | 12/2005 | Hatass et al. | | |
| 2006/0060634 A1 | 3/2006 | Hattass et al. | | |
| 2006/0068621 A1 | 3/2006 | Hattass et al. | | |
| 2007/0137607 A1 | 6/2007 | Ledbetter | | |
| 2010/0045028 A1 | 2/2010 | Blivet | | |

FOREIGN PATENT DOCUMENTS

| | | |
|---|---|---|
| DE | 698 23 351 T2 | 3/2005 |
| DE | 10 2004 027 831 B3 | 3/2006 |
| DE | 10 2004 045 135 B3 | 4/2006 |
| DE | 10 2004 046 797 A1 | 4/2006 |
| DE | 10 2006 059 371 A1 | 7/2007 |
| EP | 0 203 672 A2 | 12/1986 |

(Continued)

*Primary Examiner* — David E Bochna
(74) *Attorney, Agent, or Firm* — Harness, Dickey & Pierce, P.L.C.

(57) ABSTRACT

A conduit arrangement for a pressurized fluid, in particular for connecting a gearbox to an oil cooler. The conduit arrangement comprises a first fluid conduit and a second fluid conduit which can be connected to a housing, such as a gearbox housing, by a connecting arrangement. The connecting arrangement has a first connecting part and a second connecting part which have a respective through-passage. At least one of the connecting parts is made of plastic, wherein at least one of the fluid conduits is made of plastic. The plastic connecting part and the plastic fluid conduit are integrally connected to one another.

15 Claims, 3 Drawing Sheets

FOREIGN PATENT DOCUMENTS

| | | |
|---|---|---|
| EP | 0 751 024 A1 | 1/1997 |
| EP | 1 942 296 A1 | 7/2008 |
| FR | 2 911 942 | 8/2008 |
| WO | WO 03/072988 A1 | 9/2003 |

* cited by examiner

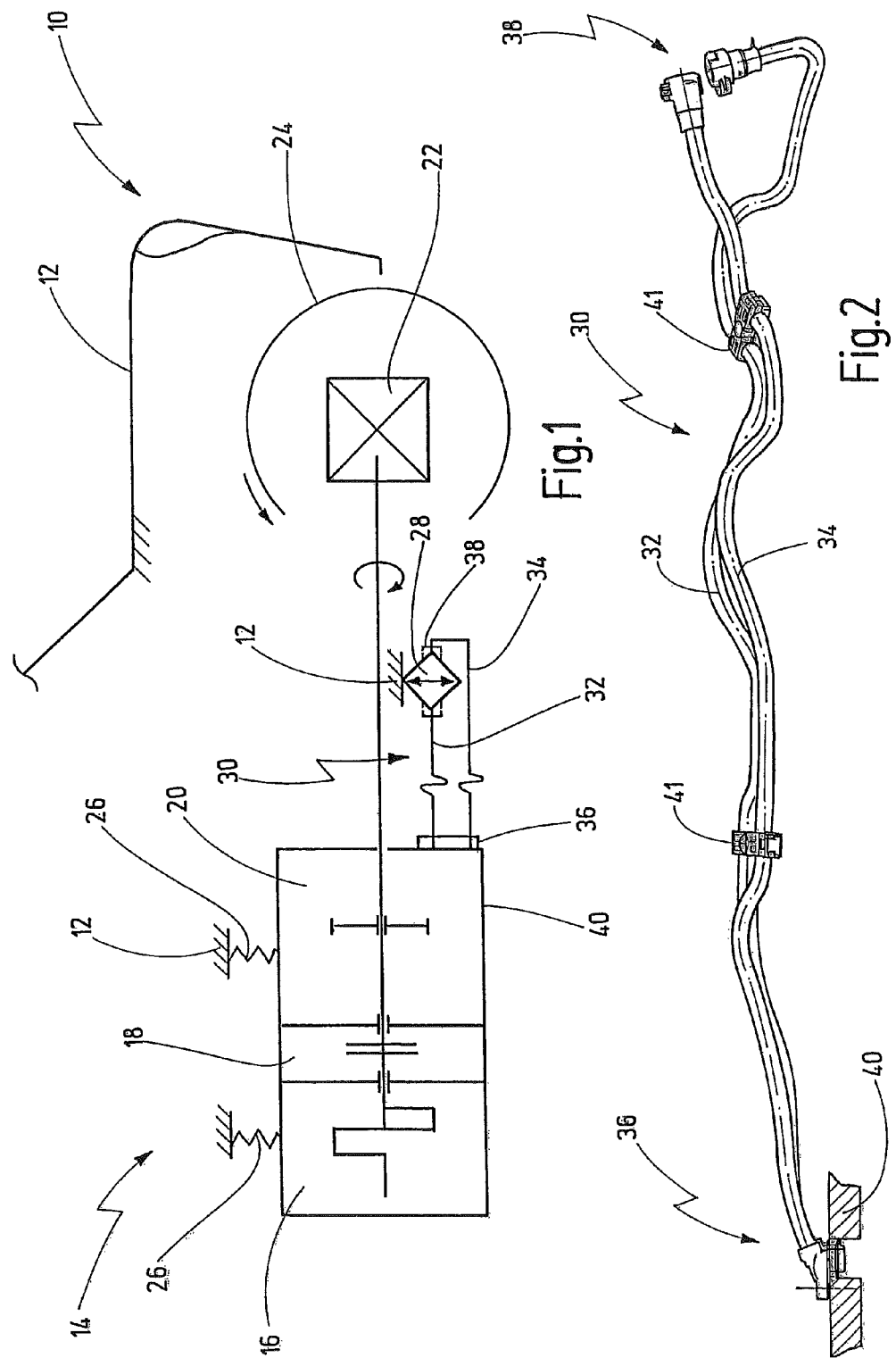

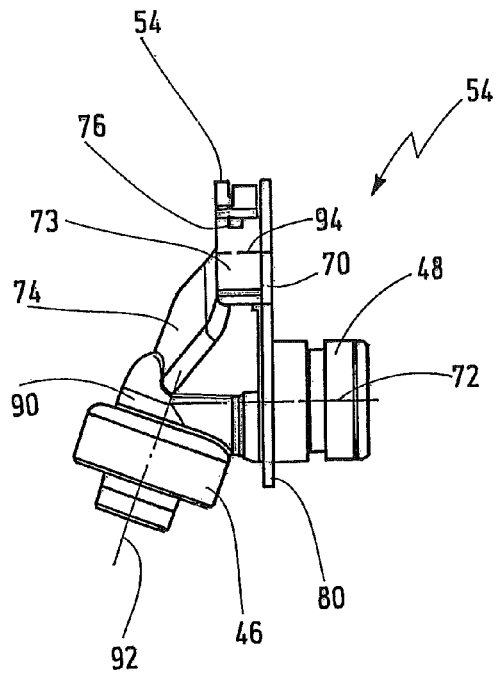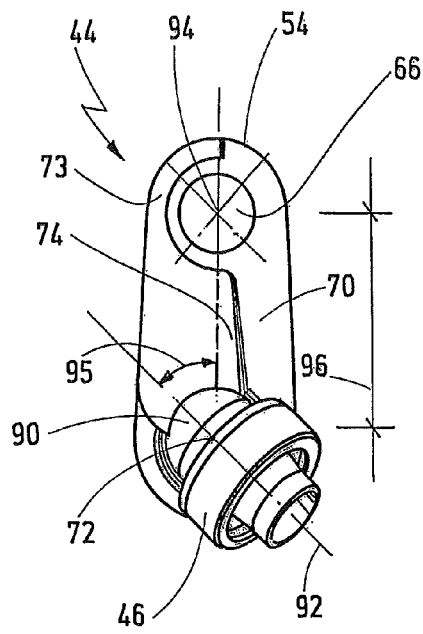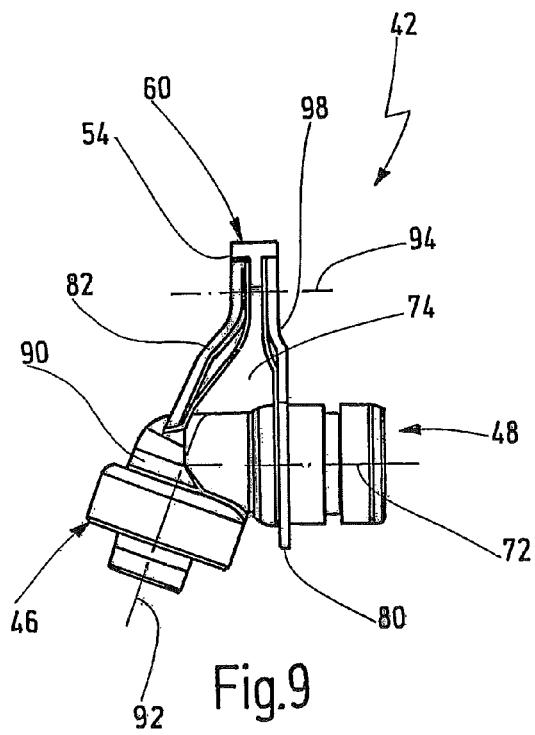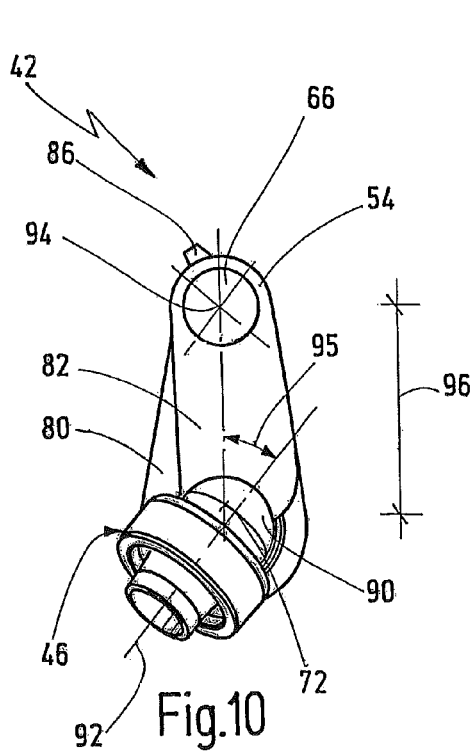

CONDUIT ARRANGEMENT FOR A PRESSURIZED FLUID, AND METHOD FOR THE PRODUCTION THEREOF

CROSS REFERENCE TO RELATED APPLICATIONS

This application claims priority to German patent application DE 1 2008 059 0878, filed Nov. 26, 2008.

BACKGROUND OF THE INVENTION

The present invention relates to a conduit arrangement for a pressurized fluid, in particular for connecting a gearbox to an oil cooler, comprising a first fluid conduit and a second fluid conduit which can be connected to a housing, such as a gearbox housing, by means of a connecting arrangement.

The invention also relates to a method of producing such a conduit arrangement.

To connect a gearbox to an oil cooler, it is known to use a conduit arrangement which has a flexible section and a rigid section. The flexible section is required for absorbing vibrations, since the gearbox is generally suspended elastically to the body of a vehicle and can therefore vibrate relative to the body. The oil cooler, on the other hand, is generally installed fixedly in relation to the body. The relative movements between the gearbox and the oil cooler can be absorbed by the flexible section in this case. Metal conduits, in particular on an aluminum basis, are generally used for the rigid section. The flexible or elastic section is as a rule formed from tubes made of elastomer materials. These tubes are preferably designed as heat-shrink tubing.

The rigid conduits are in this case secured to the housing, to be precise by means of a connecting arrangement which is formed from a complicated cast structure made of metal on account of the forces introduced. This connecting arrangement has two connection sockets for the feed and the return and a fastening point for attaching to the housing.

The connecting arrangement and the rigid fluid conduits are often frictionally connected to one another. Furthermore, a connection between the rigid metal conduits and the flexible tube conduits is as a rule realized by adapter elements, which on account of their construction can result in a reduction in diameter of over 20%.

On the side of the oil cooler, fluid conduits are as a rule attached to the oil cooler housing by means of push-in connectors. These push-in connectors are connected to the fluid conduits by a frictional connection.

The relatively complicated design described above is also selected because continuous thermal loads of 130° C. can occur in such conduit arrangements, wherein peak temperatures up to 180° C. can occur. Furthermore, the fluid conducted in the fluid conduits can have a pressure up to 10 bar. Furthermore, on account of the installation situation, certain impact resistance and resistance to zinc chloride are required.

The construction of such a conduit arrangement is complex on account of the multiplicity of individual parts. The steps required for assembly are relatively costly. In addition, the conduit arrangement is comparatively heavy. This is also particularly disadvantageous on account of the vibrations that occur during travel operation.

BRIEF SUMMARY OF THE INVENTION

Against this background, an object of the invention is to provide an improved conduit arrangement and an improved method of producing such a conduit arrangement.

This object is achieved by a conduit arrangement for a pressurized fluid, in particular for connecting a gearbox to an oil cooler, wherein the conduit arrangement has a first fluid conduit and a second fluid conduit which can be connected to a housing, such as a gearbox housing, by means of a connecting arrangement, wherein the connecting arrangement has a first connecting part and a second connecting part which have a respective through-passage, wherein at least one of the connecting parts is made of plastic, wherein at least one of the fluid conduits is made of plastic, and wherein the plastic connecting part and the plastic fluid conduit are integrally connected to one another.

The above object is also achieved by a motor vehicle having such a conduit arrangement and by a method of producing a conduit arrangement, in particular a conduit arrangement of the abovementioned type, comprising the steps:

providing a first connecting part made of thermoplastic;
    providing a first fluid conduit made of thermoplastic;
    integrally connecting the first connecting part and the first fluid conduit by friction welding.

In the conduit arrangement according to the invention, the plastic connecting part and the plastic fluid conduit are integrally connected to one another. Consequently the conduit arrangement can be realized with few individual components. In addition, the integral connection avoids leakage problems. On account of the plastic material, a lightweight conduit arrangement can be realized.

The integral joint between the plastic connecting part and the plastic fluid conduit can generally be realized in any desired manner, in particular if the integral connection provides for all-round tightness between the fluid conduit and through-passage.

As a result, additional securing means, such as mechanical fastening means or adhesives, are not required. The tightness at the joint locations can be ensured on a long-term basis. In addition, undesirable notch effects at the joint locations on account of mechanical loads can be avoided. Compared with a frictional connection, such integral connections can absorb the pressure and thermal loads that occur during use as gearbox oil cooler conduits.

Since the fluid conduit and the plastic connecting part are preferably produced separately from one another, it is preferred to connect these elements to one another by friction welding.

According to a further preferred embodiment, which constitutes a separate invention independently of the integral connection between the connecting part and the fluid conduit and independently of the production thereof from plastic, each connecting part has at least one housing connection section, at least one conduit connection section which is connected to the housing connection section via a through-passage, and at least one fastening section, wherein the fastening sections are adapted to one another or can be aligned with one another in such a way that the connecting parts can be fastened to the housing by means of a single fastening element.

In particular when the connecting part and the fluid conduit are connected to one another by friction welding, a relative rotation occurs between these elements during this joining process. Accordingly, each fluid conduit is connected to a separate connecting part. Due to the fact that the connecting elements are adapted to one another, assembly by means of an individual fastening element is nonetheless possible, such that the assembly cost can still be kept low.

In this case, it is especially advantageous if at least one of the connecting parts has at least one web between the housing connection section and the fastening section, said web increasing the bending resistance.

As a result, the tightness between the housing connection section and the housing can also be ensured when fluid at a relatively high pressure is conducted. In other words, a situation in which the housing connection section lifts relative to the housing on account of such a pressure can be avoided.

Furthermore, it is preferred in this case if a connection axis of the housing connection section of at least one of the connecting parts is oriented in parallel with a fastening axis of the associated fastening section.

This permits an optimized action of force of the fastening section on the housing connection section.

According to a further preferred embodiment, a conduit axis of the conduit connection section of at least one of the connecting parts is oriented at an angle to a connection axis of the associated housing connection section.

As a result, the connecting arrangement can be configured such as to be optimized in terms of construction space, in particular in a direction perpendicular to the housing surface. At the same time, it goes without saying that the through-passage which connects the conduit connection section and the housing connection section is designed with a bend in this case. In this configuration, when pressurized fluid is being conducted, it is of even greater significance that the bending resistance of the connecting part between the housing connection section and the fastening section is optimized.

An angled orientation generally refers to an angle of the axes within the range of greater than 0° and less than 90°, in particular greater than 30° and less than 80°.

Furthermore, it is especially preferred if the conduit axis is also oriented at an angle to a connecting plane between the fastening axis and the connection axis.

In this case, it is possible to orient the conduit axes of the two connecting parts substantially parallel to one another in a state mounted on the housing.

Furthermore, it is preferred on the whole if one of the connecting parts has a projection and the other connecting part has a recess in which the projection engages.

This measure enables the connecting parts to be aligned with one another and secured to one another at least temporarily in such a way that the connecting parts can be secured to the housing in a simple manner by means of a single fastening element.

Furthermore, this configuration makes it possible, if appropriate, to define the relative position of the connecting parts in advance. In this way, the assembly cost and the reliability of assembly can be optimized overall.

Furthermore, it is on the whole advantageous if at least one of the fluid conduits from the connecting arrangement right up to a connection arrangement, by means of which the fluid conduit can be connected to a further housing, such as an oil cooler, is made throughout of a uniform plastic material.

Firstly, the friction welding process preferably carried out for the connection to the respective connecting parts can be realized more easily in this way.

It is at the same time especially advantageous if the plastic material is a heat-resistant and pressure-resistant thermoplastic.

In the method according to the invention for producing a conduit arrangement, it is especially preferred if the connecting part is rotated about a conduit axis during the friction welding step.

A relative rotation set up for the friction welding between the connecting part and the fluid conduit could certainly also be realized by the fluid conduit being rotated relative to the connecting part.

The preferred embodiment, in which the connecting part is set in rotation, permits the use of the friction welding process even when the connecting conduits have complex three-dimensional shapes.

In addition, it is possible in this case for the fluid conduits to be connected to the connecting part in a precise position with respect to the rotary angle. Consequently the connecting part can be integrated into the complex three-dimensional shape of the fluid conduit.

Furthermore, it is advantageous in the method according to the invention if a second connecting part is connected to a second fluid conduit, likewise by friction welding, and if the first and the second connecting parts are assembled in such a way that they can be fastened to a housing by means of an individual fastening element.

It goes without saying that the abovementioned features and the features still to be explained below can be used not only in the respectively specified combination but rather also in other combinations or on their own without departing from the scope of the present invention.

BRIEF DESCRIPTION OF THE SEVERAL VIEWS OF THE DRAWING

Exemplary embodiments of the invention are shown in the drawing and are explained in more detail below. In the drawing:

FIG. 1 shows a schematic illustration of a motor vehicle having a power train in which a gearbox is connected to an oil cooler via a conduit arrangement;

FIG. 2 shows a perspective illustration of a preferred embodiment of a conduit arrangement according to the invention;

FIG. 7 shows a side view of the connecting part in FIG. 5;

FIG. 8 shows a plan view of the connecting part in FIG. 5;

FIG. 9 shows a side view of the connecting part in FIG. 6; and

FIG. 10 shows a plan view of the connecting part in FIG. 6.

DETAILED DESCRIPTION OF THE INVENTION

Figure 3:
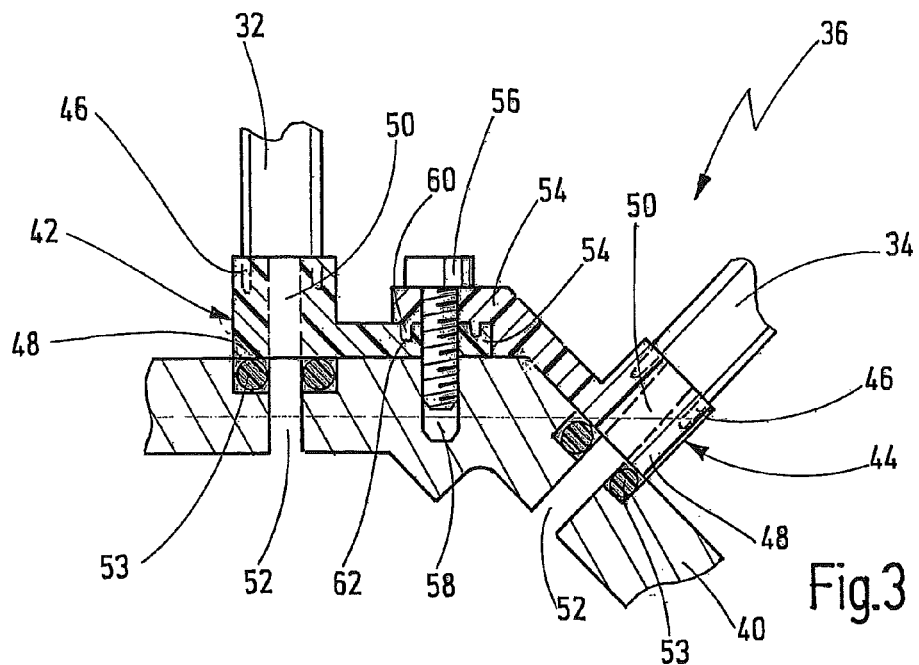
FIG. 3 shows a schematic illustration of a connecting arrangement of a conduit arrangement according to the invention.

A schematically illustrated motor vehicle is designated generally by 10 in FIG. 1. The motor vehicle 10 has a body 12 and a power train 14. The power train 14 contains an engine 16, a clutch 18 and a gearbox 20. An output of the gearbox 20 is connected to a differential 22, the output members of which are connected to driven wheels 24 of the motor vehicle 10.

The gearbox 20 and the engine 16 are mounted elastically with respect to the body 12 in order to avoid the transmission of vibrations to the body 12.

A separate oil cooler 28 which is fastened rigidly with respect to the body 12 is provided in order to cool oil in the gearbox 20. A conduit arrangement 30 is provided for connecting the gearbox 20 to the oil cooler 28, said conduit arrangement 30 containing a first fluid conduit 32 (e.g. for the feed) and a second fluid conduit 34 (e.g. for the return). Furthermore, the conduit arrangement 30 has a connecting arrangement 36, by means of which the two fluid conduits 32, 34 are connected to the housing 40 of the gearbox 20 in a sealing manner. Finally, the conduit arrangement 30 has a connection arrangement 38, by means of which the fluid conduits 32, 34 are connected to the oil cooler 28 in a sealing manner.

It is shown schematically in FIG. 1 that the fluid conduits 32, 34 must have certain elasticity in order to prevent vibrations from being transmitted from the power train 14 to the oil cooler 28.

Shown in FIG. 2 is a conduit arrangement 30 which is suitable for the abovementioned purpose. The conduit arrangement 30 contains a first fluid conduit 32 and a second fluid conduit 34, each made of a homogeneous plastic material, in particular a heat-resistant and pressure-resistant thermoplastic (e.g. a copolyamide). The expression "heat-resistant" refers in this case to the fact that the fluid conduits can withstand temperatures of at least 120° C., in particular 180° C., and pressures of at least 5 bar, in particular 10 bar.

Furthermore, the conduit arrangement 30 has a connecting arrangement 36 which contains two individual connecting parts, which are described below. The connecting arrangement 36 is designed for securing the fluid conduits 32, 34 to a housing 40, such as a gearbox housing, in a sealing manner.

Furthermore, the conduit arrangement 30 has a connection arrangement 38 which contains a quick connector for each of the two fluid conduits 32, 34. The quick connectors permit simple mounting on an oil cooler and are preferably made of a plastic material and are frictionally connected to the fluid conduits 32, 34, for example by knocking the quick connectors into the respective fluid conduit 32, 34.

Also shown in FIG. 2 are two retaining clips 41 which fix the two fluid conduits 32, 34 relative to one another in the region between the connecting arrangement 36 and the connection arrangement 38. These retaining clips 41 can be realized, for example, by plastic injection moulded parts and are preferably detachably secured to the fluid conduits 32, 34.

A connecting arrangement 36 for a conduit arrangement 30 is shown schematically in FIG. 3.

The connecting arrangement 36 contains a first connecting part 42 and a second connecting part 44, each made of a thermoplastic, preferably by the injection moulding process.

The connecting parts 42, 44 each have a conduit connection section 46, at which each connecting part 42, 44 is connected to one of the fluid conduits 32, 34. The connection between the conduit connection sections 46 and the fluid conduits 32, 34 is preferably an integral connection. It is especially preferred if the integral connection is produced by friction welding.

Furthermore, each connecting part 42, 44 has a housing connection section 48, which is connected to the respective conduit connection section 46 via an inner through-passage 50. The housing connection sections 48 produce a fluid connection between the associated inner passage 50 and an associated opening 52 in the housing 40. This connection is to be sealed off, which is shown schematically in FIG. 3 by sealing rings 53.

Furthermore, each connecting part 42, 44 has a fastening section 54 which extends laterally from the housing connection section 48. The fastening sections 54 of the connecting parts 42, 44 are aligned with one another in such a way that they can be secured to the housing 40 by means of a single connecting element 56 (for example in the form of a screw). A blind hole 58 can be provided in the housing 40 for this purpose.

Furthermore, a projection 60 is provided on the one fastening section 54, and this projection 60 engages in a corresponding recess 62 in the other fastening section 54. As a result, the relative position between the fastening sections 54 can be defined and if need be temporarily fixed before assembly on the housing 40.

In the connecting arrangement 36 in FIG. 3, the fluid conduits 32, 34 are in each case aligned axially with the associated housing connection sections 48 and openings 52 but are arranged at an angle to one another. Preferred, however, is a variant in which the fluid conduits 32, 34 extend towards the housing 40 at an acute angle of less than 90° with respect to a surface of the housing 40, as shown schematically in FIG. 2.

Figure 4:
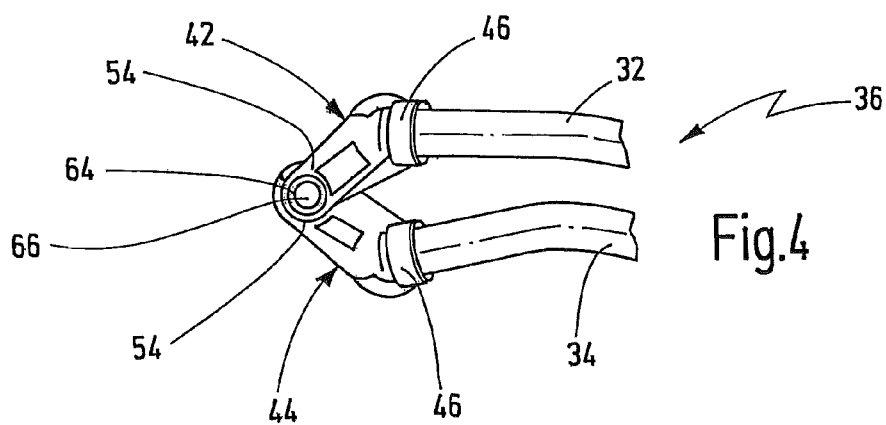
FIG. 4 shows a plan view of the connecting arrangement of the conduit arrangement in FIG. 2.

The connecting arrangement 36 of the conduit arrangement 30 in FIG. 2 is shown in a plan view in FIG. 4. With regard to its functioning, the connecting arrangement 36 corresponds to the connecting arrangement 36 in FIG. 3, and therefore the same elements are provided with the same reference numerals. Only the differences are dealt with below.

It can be seen in FIG. 4 that the two fluid conduits 32, 34 are directed to the connecting arrangement 36 approximately in parallel, such that the conduit connection sections 46 are oriented approximately in parallel with one another.

FIG. 4 also shows that the fastening section 54 of the connecting part 42 lies above the fastening section 54 of the connecting part 44, the fastening sections 54 defining a common through-opening 66 for accommodating a screw. In addition, an eyelet 64, which is preferably made of a hard material, such as metal, and defines the through-opening, is inserted in the fastening section 54 of the top connecting element 42.

The connecting parts 42, 44 are shown in greater detail in FIGS. 5 to 10.

Figures 5, 6:
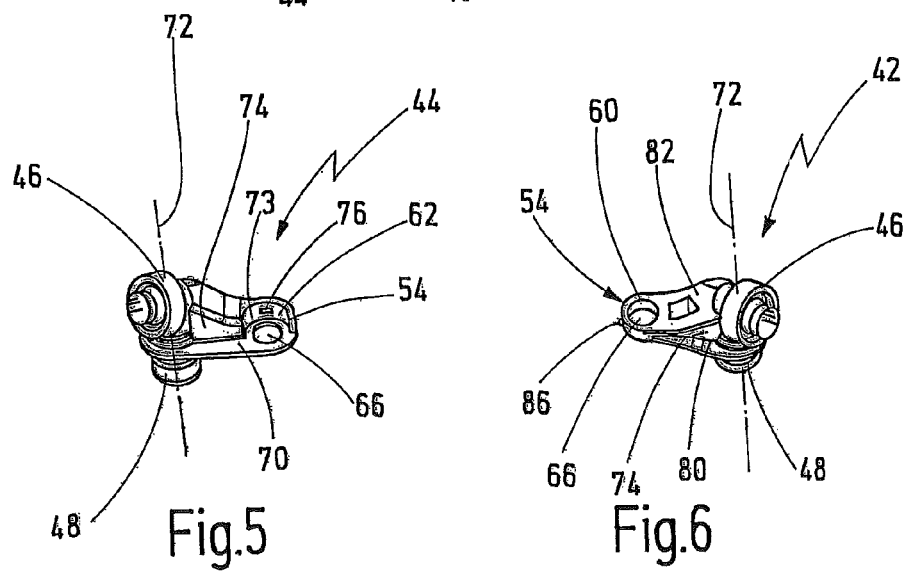
FIG. 5 shows a perspective view of a connecting part of the conduit arrangement in FIG. 4.
FIG. 6 shows a perspective arrangement of a further connecting part of the connecting arrangement in FIG. 4.

The connecting part 44 shown in FIG. 5 and in FIGS. 7 and 8 has a base plate 70 which extends between the fastening section 54 and the housing connection section 48. The housing connection section 48 extends downwards from the base plate 70, to be precise along a connection axis 72. The conduit connection section 46 extends upwards from the base plate 70.

The fastening section 54 has a marginal section which extends around the through-opening 66, projects upwards and is formed approximately in a semicircular shape in cross section. The marginal section 73 forms a recess 62 for accommodating a projection 60 of the other connecting part 42.

Furthermore, the marginal section 73 is connected to the conduit connection section 46 via a web 74, the web 74 extending upwards from the base plate 70. The web 74 increases the bending resistance of the connecting part 44 between the fastening section 54 and the housing connection section 48 (or conduit connection section 46).

Furthermore, a positioning opening 76 which is formed in the marginal section 73 is shown in FIG. 5 at 76. The positioning opening 76 is designed for accommodating a corresponding lug which is provided on the projection 60 of the other connecting part 42.

The other connecting part 42, which is shown in FIGS. 6, 9 and 10, likewise has a base plate 80 between the fastening section 54 and the housing connection section 48. An annular projection 60 of the fastening section 54 extends upwards from the base plate 80, in the centre of which projection 60 a through-opening is formed (which is designed for accommodating the sleeve 64). A further plate 82 extends from the top side of the projection 60 towards the conduit connection section 46. Formed between the base plate 80 and the further plate 82 are one or more webs 84 which increase the bending resistance between the fastening section 54 and the housing connection section 48 (or the conduit connection section 46).

A positioning lug 86 is formed on the outer circumference of the annular projection 60.

Furthermore, it can be seen that the conduit connection sections 46 of both connecting parts 42, 44 each have a bend section 90, via which the conduit connection section 46 is connected to the respective housing connection section 48.

Whereas the connection axes 72 of the housing connection sections 48 are in each case formed in parallel with fastening axes 94 of the fastening sections 54, the conduit axes 92 of the conduit connection sections 46 are orientated at an angle thereto. It can be seen in FIGS. 7 and 9 that the conduit axes 92 in each case enclose with the connection axes 72 an angle greater than 90° and preferably less than 180°, such that the conduit axes 92 assume an acute angle with the surface of the housing 40 in the mounted state, as shown in FIG. 2.

Furthermore, it can be seen that the conduit axes 92 are in each case oriented at an angle with respect to a plane which is defined by the fastening axis 94 and the connection axis 72. This angle is designated by 95 in FIGS. 8 and 10. The angles 95 of the two connecting parts 42, 44 need not necessarily be identical, but can preferably be within the range of 0° to 180°, in particular preferably within the range of 20° to 80°, in both cases.

It is possible by setting a suitable angle 95 to orient the conduit connection sections 46 approximately in parallel, as shown in FIG. 4, wherein the connecting parts 42, 44 extend in a V shape from the through-opening 66, preferably while enclosing an angle within the range of 20° to 150°, in particular within the range of 60° to 120°.

Furthermore, the respective distance 96 between the fastening axis 94 and the connection axis 72 is shown in FIGS. 8 and 10. These distances 96 between axes can be identical in the connecting parts 42, 44, but can also be different from one another. The distance 96 between axes preferably lies within the range of 10 mm to 100 mm, in particular within the range of 20 mm to 70 mm.

Furthermore, it is shown in FIG. 9 that the base plate 80 of the connecting part 42 between the housing connection section 48 and the fastening section 54 is formed with an offset, such that the sleeve-shaped projection 60 of the fastening section 54 can be put onto the base plate 70 of the fastening section 54 of the other connecting part 44 in a stress-free manner. The size of the offset corresponds approximately to the thickness of the base plate 70.

The housing connection sections 48 are preferably designed like sockets and have external grooves (not designated in any more detail) for accommodating sealing elements, such as O-rings.

The connecting parts 42, 44 can be connected to the respective fluid conduits 32, 34 by friction welding. For this purpose, the conduit connection sections of substantially identical design can have an inner socket and an outer socket extending concentrically thereto, between which an end of the associated fluid conduit can be inserted.

Furthermore, each connecting part 42, 44 has means (not designated in any more detail) on which a tool can engage in order to rotate the respective connecting part 42, 44 relative to the fluid conduit. As a result, in the region between the inner and the outer socket and the inserted end of the fluid conduit, such heat is produced that the surfaces facing one another fuse and in this way an integral, encircling (and thus sealing) connection between the fluid conduit 32, 34 and the respective conduit connection section 46 can be achieved.

The connecting parts 42, 44 attached to the fluid conduits 32, 34 can then first of all be aligned with one another for assembly. In the process, the annular projection 60 of the first connecting part 42 is put onto the base plate 70 of the second connecting part 44, to be precise in such a way that the projection 60 is enclosed by the marginal section 73 of semicircular cross section. At the same time, the positioning lug 86 engages in the positioning opening 76, such that the relative rotary position between the connecting parts 42, 44 is set, as shown in FIG. 4. The conduit arrangement 30 can then be fixed overall by the retaining clips 41 in such a way that the connecting parts 42, 44 can no longer become detached from one another before the connecting arrangement 36 formed in this way is secured to the housing 40 by means of a screw 56.

The conduit arrangement 30 according to the invention preferably has no components made of metal (except for any clamping components of the quick connectors of the connection arrangement 38), such that a lightweight conduit arrangement can be produced.

The connecting parts 42, 44 and the fluid conduits 32, 34 are preferably made of a thermoplastic material and are preferably integrally connected to one another over their entire circumference. Consequently, a high degree of tightness can be achieved in the region of the connecting arrangement 36.

In addition, on account of their material properties, the fluid conduits 32, 34 can absorb vibrations which are introduced into the conduit arrangement 30 from the gearbox 20. On account of the lightweight, it is not necessary to provide separate elastic damping elements or the like. On the contrary, the fluid conduits 32, 34, despite the oil cooler 28 being rigidly secured to the body 12, can be designed as substantially rigidly preformed plastic conduits which have the requisite elasticity on account of their length.

Furthermore, the conduit arrangement 30, at any rate in the region of the connecting arrangement 36, has no movable elements which could constitute potential leakage points. Due to the fact that the fluid conduits 32, 34 are made of the same material throughout, said fluid conduits 32, 34 can be made in a comparatively simple manner, for example from copolyamide.

The fluid conduits 32, 34 are generally designed as "rigidly preformed" conduits which assume a predetermined position in the space, said position being adapted to the respective installation situation in the motor vehicle. Nonetheless, on account of the length and the generally elastic properties of the thermoplastic, these fluid conduits 32, 34 can absorb the abovementioned vibrations of the gearbox 20.

The webs 74 and 84 ensure a high bending resistance, which is sufficient in order to be able to securely fasten the housing connection sections 48 to the housing 40 during fastening using only one individual screw 56, even if a bending moment is exerted around the fastening section 54 (in particular during pressure peaks) on account of a fluid pressure which acts, for example, on the bend section 90.

What is claimed is:

1. A conduit arrangement for a pressurized fluid, comprising a first fluid conduit and a second fluid conduit which can be connected to a housing by means of a connecting arrangement, wherein the connecting arrangement has a first connecting part and a second connecting part which have a respective through-passage, wherein at least one of the connecting parts is made of plastic, wherein at least one of the fluid conduits is made of plastic, and wherein the plastic connecting part and the plastic fluid conduit are integrally connected to one another, wherein the plastic connecting part and the plastic fluid conduit are connected to one another by friction welding, and wherein each connecting part has at least one housing connection section, at least one conduit connection section which is connected to the housing connection section via the through-passage, and at least one fastening section, wherein the fastening sections can be aligned with one another in such a way that the connecting parts can be fastened to the housing by means of a single fastening element.

2. The conduit arrangement according to claim 1, wherein at least one of the connecting parts has at least one web between the housing connection section and the fastening section, said web increasing the bending resistance therebetween.

3. The conduit arrangement according to claim 1, wherein a connection axis of the housing connection section of at least one of the connecting parts is oriented in parallel with a fastening axis of the associated fastening section.

4. The conduit arrangement according to claim 1, wherein a conduit axis of the conduit connection section of at least one of the connecting parts is oriented at an angle to a connection axis of the associated housing connection section.

5. The conduit arrangement according to claim 1, wherein one of the connecting parts has a projection and the other connecting part has a recess in which the projection engages.

6. A conduit arrangement for connecting a gearbox to an oil cooler, comprising a first fluid conduit and a second fluid conduit which can be connected to a housing by means of a first connecting arrangement, wherein the first connecting arrangement has a first connecting part and a second connecting part which have a respective through-passage, wherein at least one of the connecting parts is made of plastic, wherein at least one of the fluid conduits is made of plastic, and wherein the plastic connecting part and the plastic fluid conduit are integrally connected to one another, wherein at least one of the fluid conduits extends from the first connecting arrangement to a second connecting arrangement, by means of which the at least one fluid conduit can be connected to a further housing, wherein said at least one fluid conduit is made throughout of a uniform plastic material, wherein each connecting part has at least one housing connection section, at least one conduit connection section which is connected to the housing connection section via the through-passage, and at least one fastening section, wherein the fastening sections can be aligned with one another in such a way that the connecting parts can be fastened to the housing by means of a single fastening element, and wherein at least one of the connecting parts has at least one web between the housing connection section and the fastening section, said web increasing the bending resistance therebetween.

7. The conduit arrangement according to claim 6, wherein the plastic connecting part and the plastic fluid conduit are connected to one another by friction welding.

8. The conduit arrangement according to claim 6, wherein each connecting part has at least one housing connection section, at least one conduit connection section which is connected to the housing connection section via the through-passage, and at least one fastening section, wherein the fastening sections can be aligned with one another in such a way that the connecting parts can be fastened to the housing by means of a single fastening element.

9. A conduit arrangement for connecting a gearbox to an oil cooler, comprising a first fluid conduit and comprising a second fluid conduit which can be connected to a housing by means of a connecting arrangement, wherein the connecting arrangement has a first connecting part and a second connecting part which have a respective through-passage, wherein at least one of the connecting parts is made of plastic, wherein at least one of the fluid conduits is made of plastic, and wherein the plastic connecting part and the plastic fluid conduit are integrally connected to one another, wherein each connecting part has at least one housing connection section, at least one conduit connection section which is connected to the housing connection section via the through-passage, and at least one fastening section, wherein the fastening sections can be aligned with one another in such a way that the connecting parts can be fastened to the housing by means of a single fastening element, and further wherein at least one of the connecting parts has at least one web between the housing connection section and the fastening section, said web increasing the bending resistance therebetween.

10. The conduit arrangement according to claim 9, wherein the plastic connecting part and the plastic fluid conduit are connected to one another by friction welding.

11. The conduit arrangement according to claim 9, wherein a connection axis of the housing connection section of at least one of the connecting parts is oriented in parallel with a fastening axis of the associated fastening section.

12. A conduit arrangement for connecting a gearbox to an oil cooler, comprising a first fluid conduit and comprising a second fluid conduit which can be connected to a housing by means of a connecting arrangement, wherein the connecting arrangement has a first connecting part and a second connecting part which have a respective through-passage, wherein at least one of the connecting parts is made of plastic, wherein at least one of the fluid conduits is made of plastic, and wherein the plastic connecting part and the plastic fluid conduit are integrally connected to one another, wherein each connecting part has at least one housing connection section, at least one conduit connection section which is connected to the housing connection section via the through-passage, and at least one fastening section, wherein the fastening sections can be aligned with one another in such a way that the connecting parts can be fastened to the housing by means of a single fastening, and further wherein a conduit axis of the conduit connection section of at least one of the connecting parts is oriented at an angle to a connection axis of the associated housing connection section.

13. The conduit arrangement according to claim 12, wherein one of the connecting parts has a projection and the other connecting part has a recess in which the projection engages.

14. The conduit arrangement according to claim 12, wherein the plastic is a heat resistant and pressure-resistant thermoplastic.

15. A motor vehicle having a conduit arrangement for conducting gearbox oil between a gearbox and an oil cooler, the conduit arrangement comprising a fluid conduit which can be connected to a housing by means of a connecting arrangement, wherein the connecting arrangement has a first connecting part and a second connecting part which have a respective through-passage, wherein at least one of the connecting parts is made of plastic, wherein at least one of the fluid conduits is made of plastic, and wherein the plastic connecting part and the plastic fluid conduit are integrally connected to one another, wherein the plastic connecting part and the plastic fluid conduit are connected to one another by friction welding, and wherein each connecting part has at least one housing connection section, at least one conduit connection section which is connected to the housing connection section via the through-passage, and at least one fastening section, wherein the fastening sections can be aligned with one another in such a way that the connecting parts can be fastened to the housing by means of a single fastening element.

* * * * *